(12) United States Patent
Douglis

(10) Patent No.: US 6,249,795 B1
(45) Date of Patent: *Jun. 19, 2001

(54) PERSONALIZING THE DISPLAY OF CHANGES TO RECORDS IN AN ON-LINE REPOSITORY

(75) Inventor: Frederick Douglis, Somerset, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/965,060

(22) Filed: Nov. 5, 1997

Related U.S. Application Data

(63) Continuation-in-part of application No. 08/797,756, filed on Feb. 7, 1997, now Pat. No. 5,860,071, which is a continuation-in-part of application No. 08/549,359, filed on Oct. 27, 1995.

(51) Int. Cl.[7] .................................................... G06F 17/30
(52) U.S. Cl. ............................................ 707/511; 707/530
(58) Field of Search ................................... 707/500, 501, 707/502, 503, 504, 505, 506, 507, 508, 511, 530, 103

(56) References Cited

U.S. PATENT DOCUMENTS

| | | | |
|---|---|---|---|
| 4,807,182 | * | 2/1989 | Queen .................................... 364/900 |
| 5,008,853 | * | 4/1991 | Bly et al. ............................... 364/900 |
| 5,325,478 | * | 6/1994 | Shelton ................................. 395/148 |
| 5,438,661 | * | 8/1995 | Ogawa .................................. 395/157 |
| 5,860,071 | * | 1/1999 | Ball et al. ............................. 707/100 |
| 5,878,213 | * | 3/1999 | Bittinger et al. ................. 395/200.33 |
| 5,894,585 | * | 4/1999 | Inoue ................................... 395/827 |
| 5,903,897 | * | 3/1999 | Carrier et al. ....................... 707/203 |
| 5,933,811 | * | 8/1999 | Angles et al. ......................... 705/14 |

OTHER PUBLICATIONS

Douglis, Fred et al., "The AT&T Internet Difference Engine: Tracking and Viewing Changes on the Web," AT&T Labs—Research and Lucent Technologies, Bell Laboratories, 1997, pp. 1–33.

* cited by examiner

Primary Examiner—Stephen S. Hong

(57) ABSTRACT

The invention provides for customized "what's new" lists for users of shared lists of tracked resources. Identifying information, such as cookies, and state information are used to personalize a shared "what's new" list, so that changes to a document which a particular user has viewed are indicated automatically based on the last time that user viewed the document. Thus, the user is notified of the set of changes that have taken place since the user last viewed a particular set of documents. For any particular document, only the changes which have occurred since the user last viewed that document are used to form the "what's new" list and to view the changes if the user so chooses. Additionally, a user can select multiple collections of documents into a single notification system and exclude particular documents or augment the collection to personalize the resources tracked for that user.

26 Claims, 7 Drawing Sheets

FIG. 3A aide.research.att.com    FALSE    /cgi-bin    FALSE    905386822
                                 ID       68ea304124beaa7e648cc1327d79360a

FIG. 3B douglis|http://www.att.com/news/|544|875028656|0|*|875041875|1000|0|
   AT%26%20Newsroom|40|1|0|1|875041875|*|*|*|
1.1/829323127,1.2/833849119,1.3/838394364,1.4/840037595,
1.5/840669559,1.11/863462121,1.12/863705707,1.13/864143831,
1.14/865604477,1.15/866649270,1.16/867184411,1.17/869583704,
1.18/871601489

PERSONALIZING THE DISPLAY OF CHANGES TO RECORDS IN AN ON-LINE REPOSITORY

This application is a continuation-in-part of the U.S. application Ser. No. 08/797,756, which was filed Feb. 7, 1997, issued as U.S. Pat. No. 5,860,071.

This is a continuation-in-part of U.S. application Ser. No. 08/549,359 which was filed Oct. 27, 1995, which is herein incorporated by reference.

BACKGROUND OF THE INVENTION

Information which is stored in computerized systems, databases or repositories can change frequently. These changes are typically made without notice being given to those with access to that information. For example, software development frequently involve s access by many persons to code stored in a central location. The various programmers can change the central code without notifying the other programmers working on that code. Another example is the Internet, where the content of a resource ("home page" or "page") can be changed and all the users with access to that resource are not notified of the changes.

Persons with access to such systems, therefore, do not know on a daily basis whether and how the information has changed since a previous examination of the information. Instead the person must spend valuable time examining the information, such as the code or resource content from the examples above, to determine if there were any modifications and what the modifications were.

Many of these systems indicate that changes have been made but do not identify the actual changes. Other systems, generically known as "diff" systems, identify the changes but only in response to the user's decision to compare two specific stored versions.

Versioning control systems exist to facilitate this examination process. These systems store multiple versions of a document from different time periods. These multiple versions can be stored in full or be partially stored so that a selected version can be generated from a previous version plus incremental information concerning the intervening versions. These version control systems serve to identify differences between versions of a document stored in a local repository. Revision Control System (RCS) format is a specific example of these generic versioning systems.

SUMMARY OF THE INVENTION

The current AT&T Internet Difference Engine (AIDE) allows a user to track a set of resources, referred to by Universal Resource Locators (URLs). The system notifies the user when the tracked resources change, either by electronic mail or in a list which is generated upon request. The list is generated based on the URLs tracked by that individual user. The list informs the user of which resources have recently changed and enables the user to view those recent changes. Once the user has viewed the page, the modified resource drops off that user's "what's new" list.

Another implementation of AIDE provides for a shared list of resources which is tracked. The user can then access the list and view the documents which have changed recently. Once the user views a document on the list, it remains on the list for the other users of the shared list. Only the most recent changes will be displayed for documents on this list, so if the document has changed several times since the user last viewed the document, some of the intervening changes will not be identified to the user unless the user specifically requests the comparison of a different pair of document versions.

The present invention uses "cookies" or any other form of personalized user information and state information stored by a server or an external service, such as AIDE, to customize user's "what's new" list and the differencing of documents, even for those users who do not register their preferences. A cookie is arbitrary data that a server provides to a browser in order to uniquely identify that user upon subsequent access to that server. This invention enables the shared list to be personalized for each user. When a user views the changes to a document, the changes displayed are the changes from the time the user last viewed the document (the changes are specific to that user's viewing habits), rather than only the most recent changes based on the external service's polling interval. Thus, the shared resource list is personalized for each user and the lines between public and private tracking of resources are blurred.

Another implementation of the invention provides information to AIDE concerning documents which the user has viewed outside of the system. Information concerning documents or pages that the user has viewed directly through a repository, such as the Internet, are stored by the server and accessed via the unique identifier stored as a cookie file or other form of personalized information. That information can be used to generate a more accurate list of which documents or pages of interest have changed and what the changes to those documents were since the user's last viewed them.

One advantage of this approach is to permit any host site on the Internet to have a "What's New to this Site" link which is customizable for each visiting user based on that user's cookie file or such other personalized data record. The "What's New" link can even be omitted from a site dynamically if there is nothing new for a given user. These advantages also apply to other types of database scenarios wherein multiple users have access to a central repository.

BRIEF DESCRIPTION OF THE DRAWINGS

The above, and other, objects, features and advantages of the present invention will be apparent from the following detailed description of the preferred embodiments when read in conjunction with the accompanying drawings in which the corresponding parts are identified with like reference numerals.

FIGS. 3A and 3B show examples of information stored in a cookie and state information stored by the server, which contains information about which revisions of a page or document the user has viewed.

PREFERRED EMBODIMENTS

The invention provides for the customization of a "what's new" list from one or more shared lists of resources and thus has the effect of blurring the lines between public and private sets of resources. The use of information stored in a cookie file or personal record combined with the state information from the server provides more accurate information regarding which resource version a user last viewed since the user's viewing habits outside of access through the external service are also available.

Figure 1:
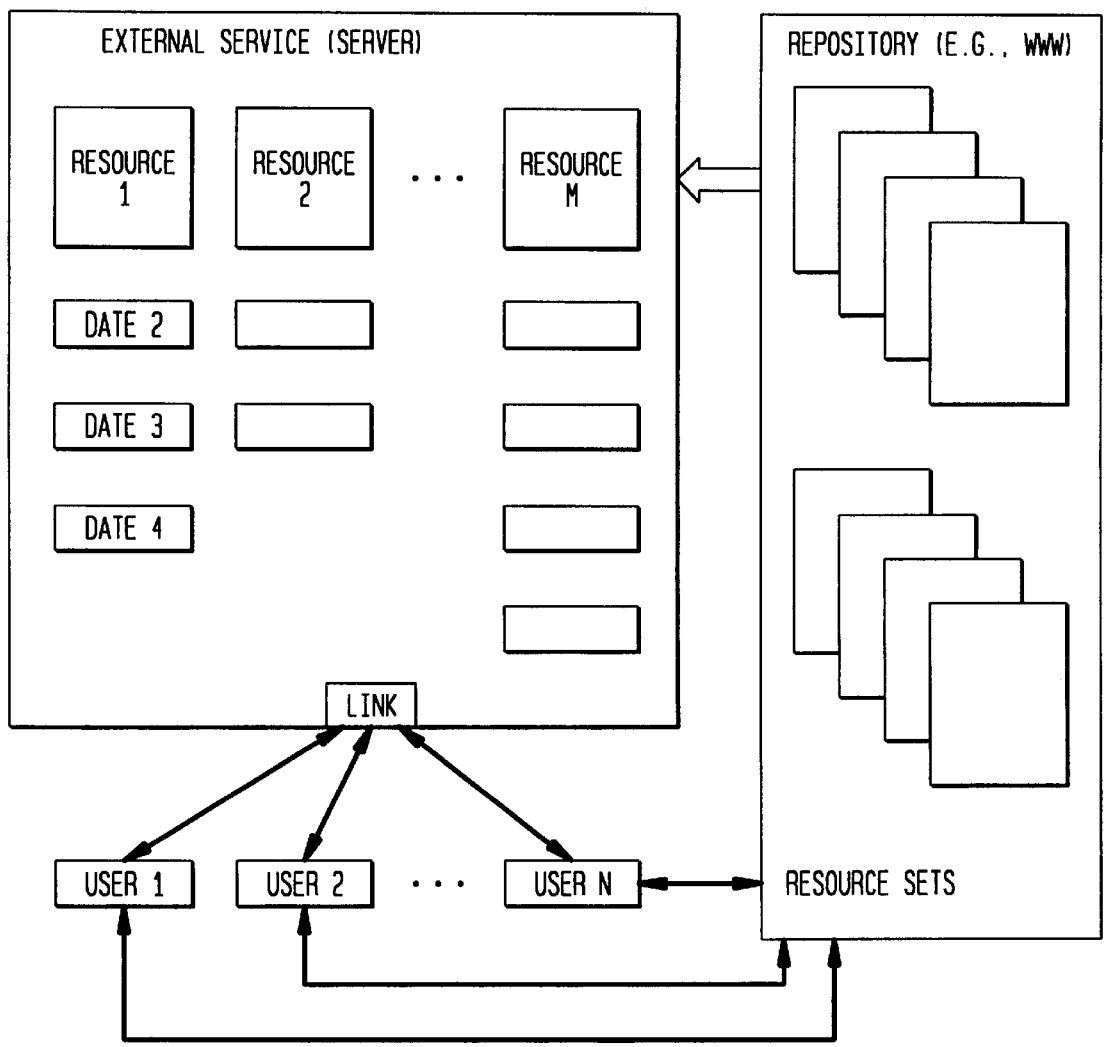
FIG. 1 illustrates the overall relationship between the user, repository and external service as implemented in the present invention.
Figure 2:
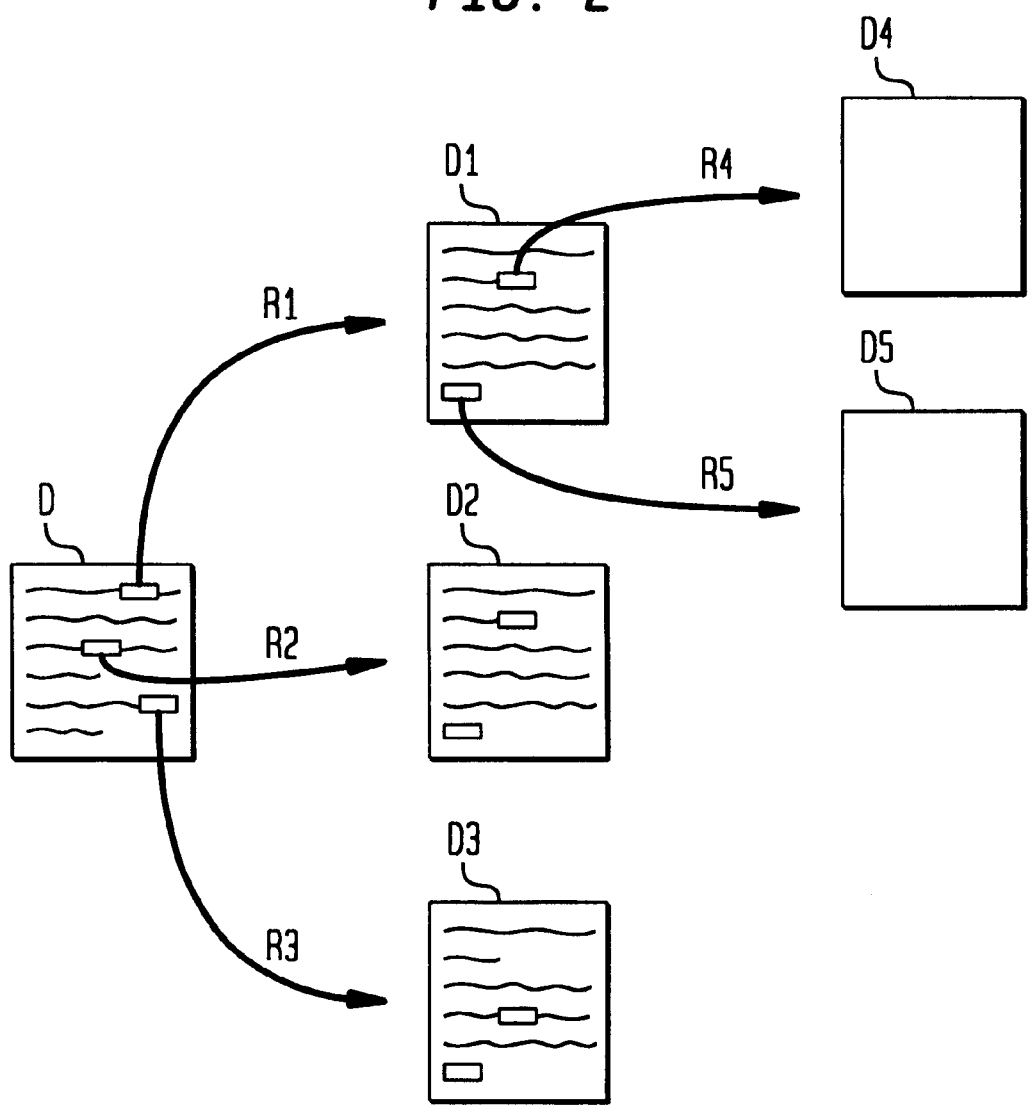
FIG. 2 illustrates the concept of hypertext links used in the World Wide Web and other repositories.

A commonly used repository of information is known as the World Wide Web (WWW). In the WWW, providers of information make their information available to users of the WWW in the form of a resource or set of pages, as shown in FIG. 1. These resources are linked together by hyperlinks, as shown in FIG. 2. Each resource has a specific Universal Resource Locator (URL) assigned to it, the URL provides a unique identifier for each resource and allows the user's browser to locate a particular resource in the repository.

FIG. 2 shows the hyper-link between resources. Resource D has links R1, R2 and R3, which links resource D to resources D1, D2, and D3, respectively. These latter resources also contain links to more resources and so on. The links may refer back to a previous resource or to additional new resources. The links enable a user to move from D to D2 by clicking on link R2. Thus, the user can easily move between resources in the repository.

Under the invention a webmaster, system administrator or user selects a list of resources for the system to follow. These resources may be selected by the individual users or based on usage by users within a department and then filtered by an administrator or merely chosen by a user who provides for access to his or her list by other users. The selected resources form a "resource set". Only the designated resources can be viewed for differencing by users of the external service and only pages actually stored in the external service can be used to generate a difference page with htmldiff. Htmldiff is a specific example of a differencing program used to show the changes to a resource or page when comparing two different versions of the document.

Each resource added to the "resource set" is stored in the external service. The system then polls these resources in the repository at some frequency. The polling frequency can vary from resource to resource depending, for example, on the nature of the resource or its relative importance. The system polls each resource and determines if the content of the resource has changed. This determination can be made through the use of modification dates, checksums or by running the htmldiff program on the resource once it is downloaded. Additional methods of determining whether the content of the resource has changed are known in the art and any such method can be used. If a resource is determined to have changed, the changed resource is logged into the external service database, as shown by resources 1 to M and the dated versions illustrated directly below them in FIG. 1.

To save storage space in the external service, the resources are stored in versioning control system, such as in Revision Control Systems (RCS) format. Preferably the most recent version is stored in full and the information necessary to recreate earlier versions of the document is stored by the service. Thus in FIG. 1, under each resource 1 to M is listed the information necessary to recreate that resource as of an earlier date, e.g., under resource 1 information to recreate that resource as of dates 2, 3 and 4 is maintained. The external service is maintained on a server which contains communication links for the users and software for storing and maintaining the files stored thereon.

Users can access resources through the external service or directly through a repository, such as the WWW. Note that the present invention is not limited to use on the Internet and can be used on other repositories, such as common databases for programmers or a corporate intranet. When a user accesses a resource through the repository or the external service, a record is made of the resource version (date and time) which the user views. The service or repository server provides arbitrary data to the user's browser, which is then provided to the server by the browser on subsequent visits by the user to identify the user to the server. The arbitrary data is commonly known as a cookie. The information in a cookie cannot be large or complicated, for example MD-5 signature (a string of hexadecimal digits) of a pseudo-random string can be used.

The server looks up the string in a relational database to identify the user. The user is then identified in the server by an internal numeric identifier. Character names could also be used to identify the user, for example, with respect to users sharing resource lists. The server stores state information for each numeric identifier. Further information on cookies can be found in the Request for Comments at ftpi://ietf.org/internet-drafts/draft-ieft-http-stat-man-mec-03.txt, which is herein incorporated by reference. Other forms of personalized records include HTTP authentication, which requires more work on behalf of users than do cookies, and Java applets or other client-side execution environments, mentioned below.

The external service server contains state information for each user in a Relational Data Base Management System (RDBMS). The important state data is stored, as shown in FIG. 3B, and is summarized below (note: other state information is also maintained by the server):

USER: Each user (or community of related resources controlled by one identifier for purposes of adding new pages, deleting pages, etc.) has certain per user state information, such as email address, default polling frequency, "what's new" list display parameters, when the user last obtained a "what's new" list and the cookie stored by the user's browser.

URLS: Each URL is associated with a modification date/time, a checksum (if no modification date/time is provided), a time when the resource was last checked by the system, and a version archive which normally is external to the database but need not be.

USERURL: Each user tracking a URL or group of URLs has a list of revisions and modification timestamps corresponding to each URL. This state information enables different users to track the same URL and obtain differencing information based on when that user last viewed a resource.

CACHED: The output of htmldiff is cached once it is generated so that subsequent comparisons of the same version can be returned immediately.

DELETED: A user can delete a URL from a resource set so that that particular resource will not be on the what's new list for the user. Previously the DELETED relation ensured that resources deleted by a user would not be added through later recursive searches, but this relation has been extended to the present invention. DELETED allows user A to track page X from a resource set and user B to delete page X from that same resource set so that it is not tracked.

A previous version of AIDE ran on individual user's computers, thus each user's browser history could be used to personalize his or her "what's new" list. However, the present invention is run by an external service server and so does not have access to a user's browser history file. The present invention uses the cookie files stored by the user's browser with the state information stored on the server to personalize for each user the determination of whether a resource has changed and what the changes are for the resource. The use of cookies by the present invention also enables the system to consider resources that the user views outside of the system since the cookie will enable access to that state information. HTTP authentication can also identify a user, but using cookies is simpler since they do not involve user input.

An example of the information stored in a cookie file is shown in FIG. 3A. The first string in FIG. 3A is the hostname of the server. The cgi-bin refers to a path within the host server. The 905386822 integer represents the expiration date of the cookie, which should play no part in the invention since the user should view the resources frequently enough to make any expiration a non-issue. ID is the name of the cookie. The string of letters and numbers following ID is the value of the cookie used to identify the user in the relational database of the server.

The use of cookies enables public lists to be personalized for individual users by combining their identifying qualities with the user's state information in a difference determination. Privacy concerns regarding the state information stored on the server can be addressed by storing more information on the client-side. Cookies are not, in their present incarnations, appropriate vehicles to store such information because of their limited storage abilities. Additionally, cookies are transmitted on every operation and system performance would be impeded if too much information was processed for each operation.

Java applets or other such client-side utilities can be implemented to perform most of these operations on the client-side and thus preserve additional privacy of the users. However, even if the entire database is stored on the client-side, there are no privacy benefits retained if the server must process this information.

Figure 4:
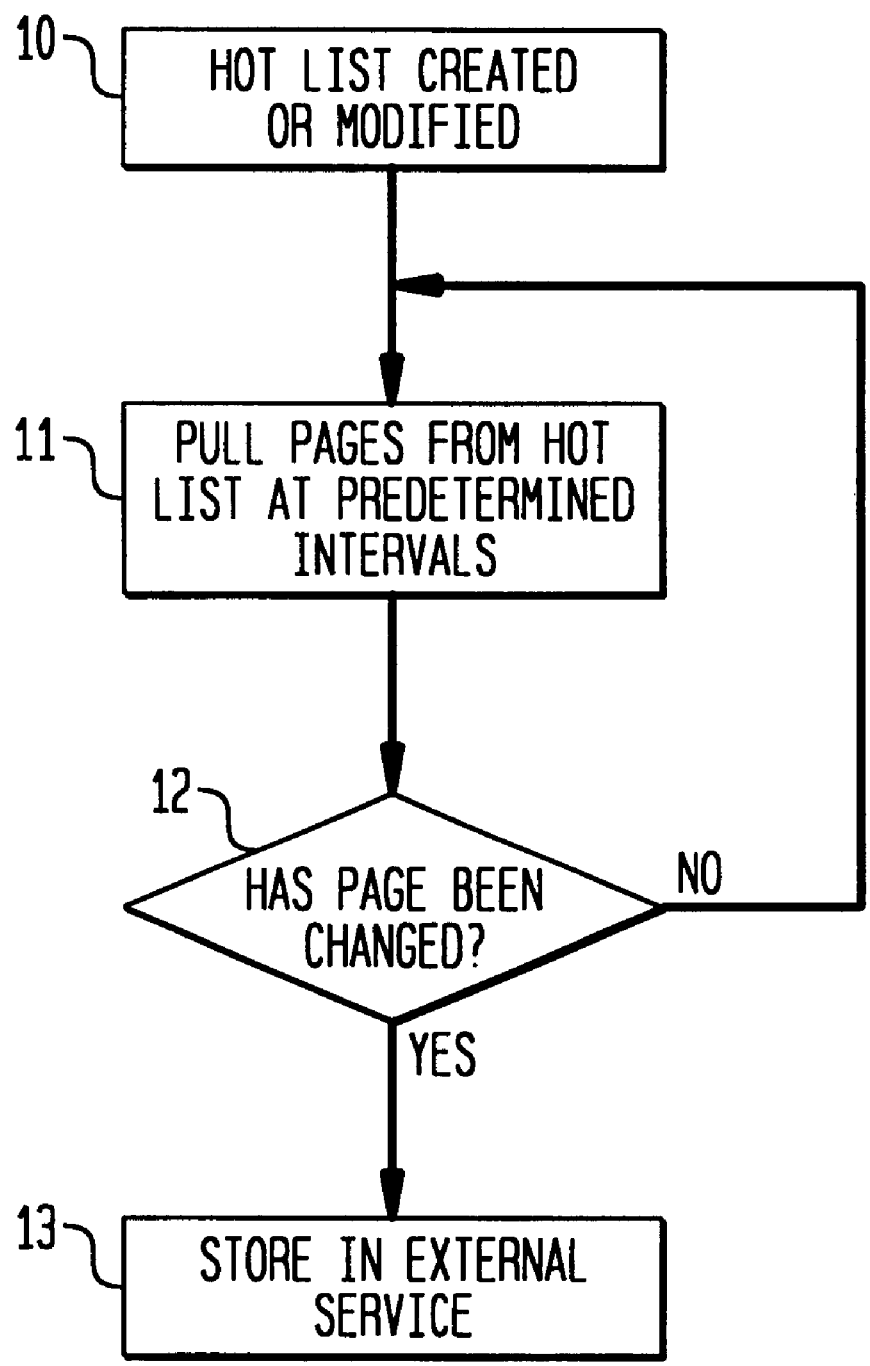
FIG. 4 is a flowchart illustrating the collection and storage of documents by the external service according to the present invention.
Figure 5:
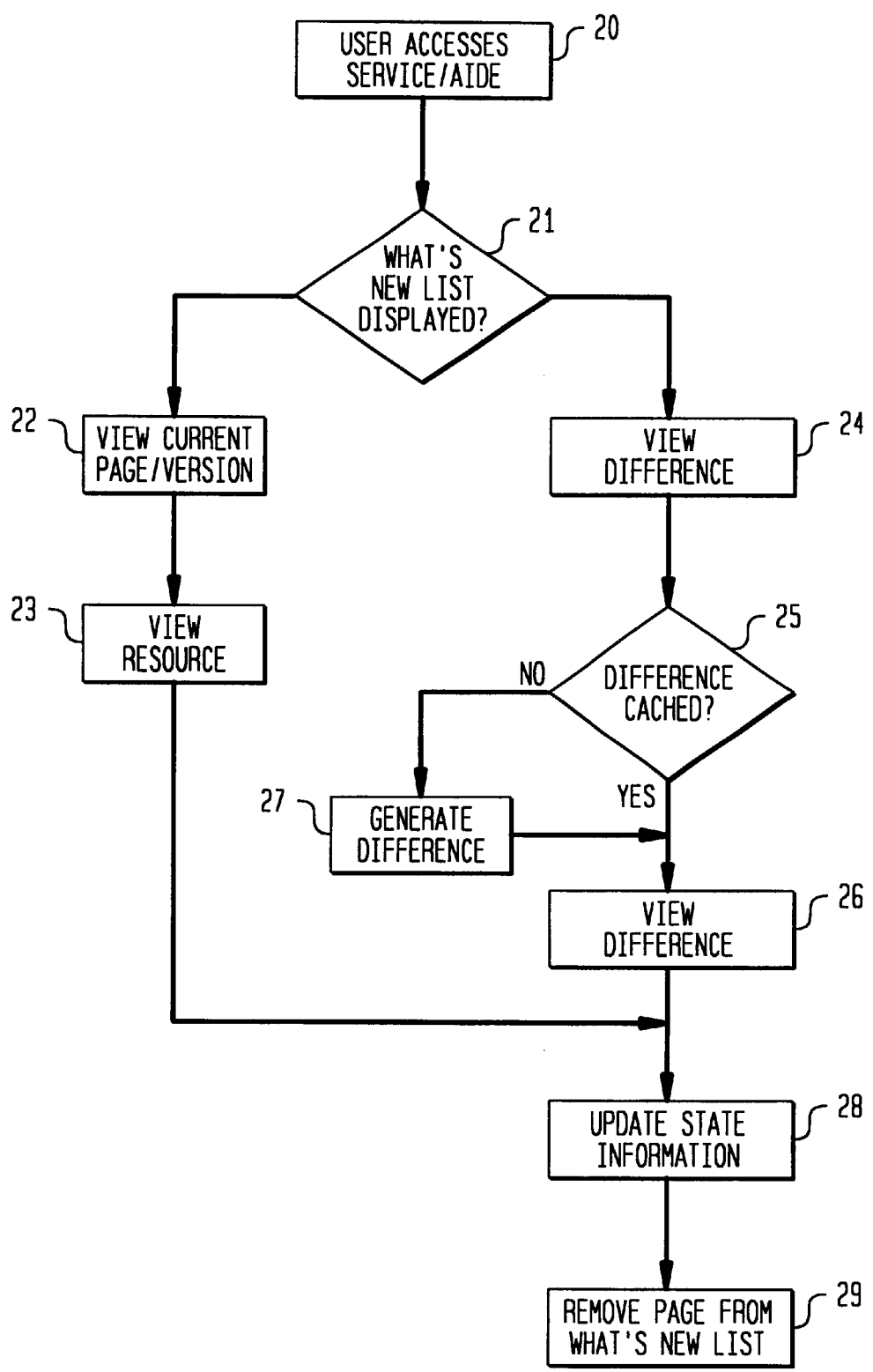
FIG. 5 is a flowchart illustrating the access options for a typical user to the external service according to the present invention.

Flowcharts are shown in FIGS. 4 and 5 to illustrate how the system functions according to the present invention. The "resource set" is created and/or modified in step 10 by the administrator. The resources on the "resource set" are retrieved and stored in the external service if the list is new. If the list has merely been modified, then only those new resources not currently in the external service need to be retrieved initially.

In step 11, the resources on the "resource set" are polled at selected intervals, which can be the same for every resource or can vary depending on the several factors, including how often the resource is viewed by the various users of the service and how often the administrator anticipates that changes will occur in the specific resource. If a resource has not changed, then the next resource is polled until all of the resources on the list have been polled. If the system determines that a resource has changed, then the page is stored in version control format, such as RCS, by the external service, steps 12-13, and then the next resource is polled.

Figure 6:
FIG. 6 shows an example of a What's New List customized by the information stored in a cookie or other personal information record.

The steps associated with a particular user are shown in FIG. 5. In step 20, the user accesses the external service and runs AIDE to generate a "what's new" list. The "what's new" list has icons to allow a user to select differences or to link to the anchor/current version of the resource, as shown in FIG. 6. When a user views a resource through the "what's new" list, the resource is removed from the list and the user's state information is updated.

Once the user accesses the AIDE system via the external service, a "what's new" list is displayed, which has been personalized to that user. The server determines which version of a resource the user last viewed by using the user's cookie file and the state information stored on the server. Other variations can be implemented by using different forms of personal record information, such as those described above. The "what's new" list contains information on the resources the user has viewed, based on the version last viewed by the user, and information on resources the user has not viewed, based on the system check.

The user can subscribe to the service and thus provide details on which resources or documents the user would like listed in the "what's new" list or how the user would like those resources prioritized. However, a subscription is not necessary because the user's cookie files will have the identifying information necessary to access the state information stored on the server to determine which pages the user has viewed, so an accurate "what's new" list can be generated. The external service can access the state information from the repository server controlling that resource if such state information for the user is not stored on the external service server.

The user can preferably select the manner in which the resources are displayed in the "what's new" list, as shown in FIG. 6. FIG. 6 has "sorted by" options to allow the user to sort the new resources by parent-child relationships, most recent changes first, user designated priority (from a user profile) displayed in order, or some other option provided to the user or programmable by the user. The parent-child relationship refers to those resources tracked by recursion (children) versus resources explicity tracked by the user (parent). Resources can be tracked recursively by the Web-Guide System described in U.S. patent application Ser. No. 08/797,756 filed Feb. 6, 1997 which is herein incorporated by reference.

After the "what's new" list is displayed in step 21, the user can choose to view the current/anchor resource version, step 22, or can choose to view the difference page, step 24. If the user wishes to view the current version of the resource, he or she clicks on the icon or hyper-link which calls up that resource for viewing, step 23.

If the user chooses to view the differences, the user clicks on the appropriate icon and the external service determines if that difference has been cached, step 25. If the difference has been cached then it is retrieved from the cache for the user and no difference has to be run. If the difference is not cached, then a difference is generated, step 27, using a tool such as htmldiff. The difference is then viewed in step 26.

Whether the user views the current version or the difference, the external service updates its state information to indicate which version the user last viewed, step 28. Then the resource is removed from that user's "what's new" list, step 29.

The particular aspects of htmldiff and the difference presentation are described in the article by Fred Douglis, Thomas Ball, Yih-Farn Chen and Eleftherios Koutsofios entitled "The AT&T Internet Difference Engine: Tracking and Viewing Changes on the Web" which is available at http://www.research.att.com/~douglis/papers/aide.ps and will be formally published in the Jan. 1998 edition of World Wide Web journal, which is herein incorporated by reference.

Htmldiff and its presentation of differences does not make up any part of the present invention; other differencing engines could be implemented to show the changes between different versions of a page.

Another option, that a content provider may choose, would be to display the resource with an indication that it had changed since the user last viewed that resource. The determination that the resource has changed would be made based on the cookie identifier and the state information stored by the server. The user then has the option of viewing the current resource or examining the difference. If the user selects to view the changes, then a comparison of the two versions of the resource is done by htmldiff or similar program and the changes to that resource are displayed. Thus, the user does not have to select which versions of the document the user wants compared. Instead, the identifier in the cookie (or other record) and the state information enable the system to automatically determine what the last version was that the user viewed and conduct the comparison accordingly. Alternatively, the differences can be shown automatically when a document is selected. These preferences can be pre-selected by the users or set as defaults by a system administrator.

The present invention can find broadbased use in repositories like the WWW and the Internet by allowing users, administrators or webmasters to generate a union of predetermined set of resources which are accessible by other users. Thus, users can be presented with a set of resources having some commonality, for example, home pages in an area of interest (hockey, golf, money) or simply resources that one user recommends. An administrator, webmaster or other user would generate the list of resources and other users could subscribe to the list or otherwise express an interest in particular sets of resources. A determination could then be made for the user of which pages within the set of resources or union of sets have changed since his or her last viewing. The "what's new" list can be sorted in any manner made available to the user. Thus, the user would not have to search through the pages to determine if any modifications had been made.

Figure 7:
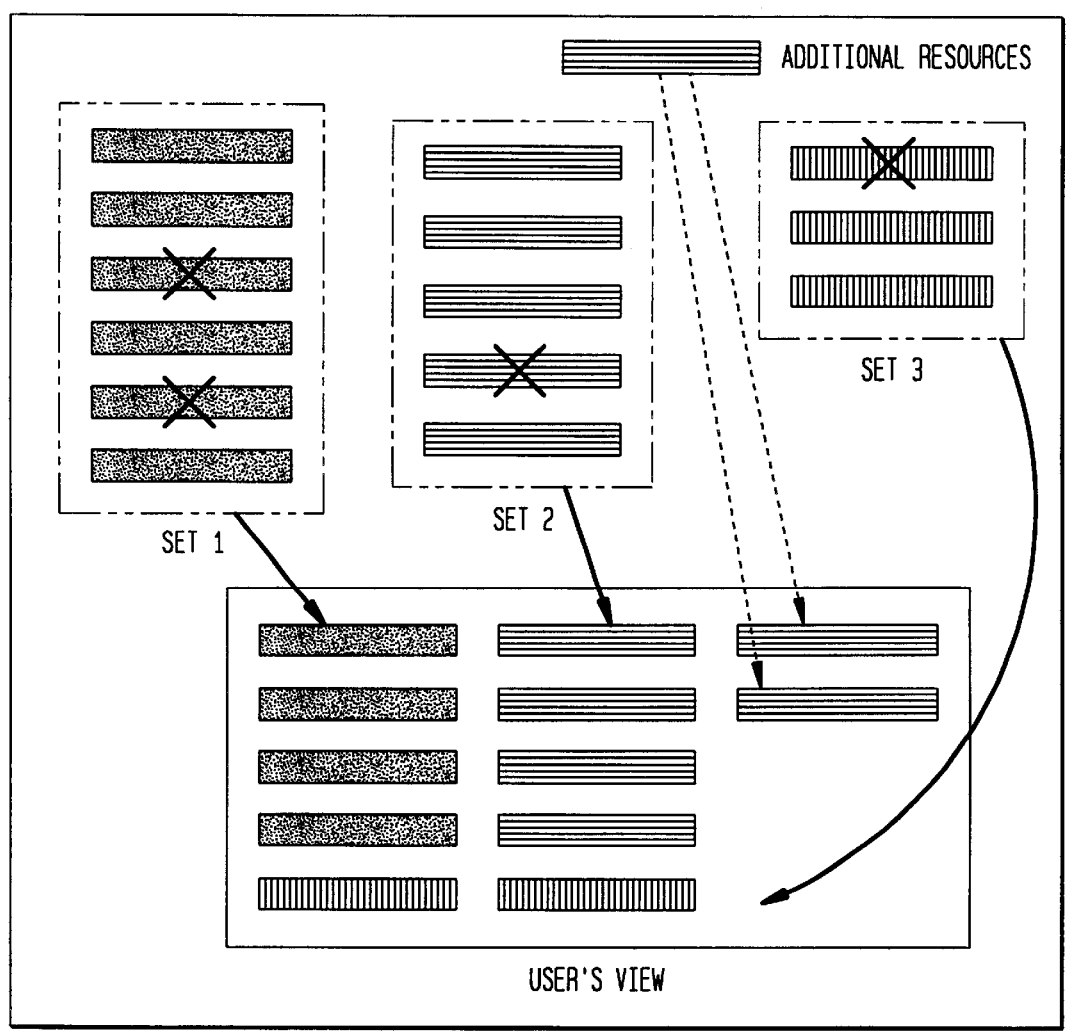
FIG. 7 illustrates the user's ability according to the present invention to customize sets of resources gathered by others which the user wishes to track.

An extension to this implementation provides the user with the ability to tailor the sets by adding new resources or deleting resources from a set and/or combining sets (including previously modified sets). This concept is illustrated in FIG. 7 and is similar to database views and inheritance within object-oriented systems. As shown in FIG. 7, the user could delete items from set 1, set 2 and set 3 and add additional resources to form a 4th set which will be tracked for changes on subsequent visits by the user. These personalized features are made possible by the use of the user's browser cookie and the state information stored in the external service which corresponds to the unique identifier in the user's cookie file.

The present invention also permits an arbitrary host site to have a "what's new" link which can be personalized for every user based on the information stored in that user's cookie file or other personal record and the state information stored by the server. By clicking on the link, a determination can be made if there have been any changes since the user's last visit to the site and those changes can then be displayed. The older versions would have to be stored by the resource's server or by an external service, such as the implementation described above.

Alternatively, display of the "what's new" link itself can be determined dynamically when the page is called up by the user. If there have been no changes to the site since the user's last viewing, then no What's New link will shown, otherwise a link to the page showing the differences can be provided.

Having described the preferred embodiments of the invention with reference to the accompanying drawings, it is to be understood that the invention is not limited to these precise embodiments and that various changes and modifications can be effected therein by one skilled in the art without departing from the spirit and scope of the invention as defined in the appended claims.

I claim:

1. A method of determining and displaying personalized changes to documents retrieved from an external repository, comprising the steps of:

storing various versions of a document in a second repository to which one or more users have access, storing information regarding each user's access to the second repository, including which document versions the user has viewed, and generating a list of modified documents and using the stored information to personalize the list, the list thus displaying modification data for the documents which the user has viewed based on the version last viewed by the user.

2. The method according to claim 1, wherein the personalized list contains information regarding the documents which the user has not viewed and the documents which the user has viewed.

3. The method according to claim 1, wherein the information includes user identifying information and state information containing data on which document version a user has viewed.

4. The method according to claim 3, wherein the state information is stored in the second repository.

5. The method according to claim 3, wherein the user identifying information is stored by the user and transmitted to the external repository upon request.

6. A method according to claim 1 wherein the step of generating the list includes communicating code from the second repository to the user;

executing the code in the user's environment to form the personalized list, thus allowing the stored information to be maintained by the user rather than by the second repository.

7. The method according to claim 1, wherein the step of storing various versions of a document, includes generating a list to be initially stored in the second repository, using an external service to poll the documents on the list by accessing the external repository at an interval, and storing those document versions containing changes in the second repository.

8. The method according to claim 7, wherein the documents are stored in the second repository in a versioning control format.

9. The method according to claim 1, wherein the stored information contains data on which documents the user viewed through the second repository and the external repository.

10. The method according to claim 9, wherein the personalized list displays modification data for the documents that the user has viewed, whether the user viewed the document through the second repository or the external repository.

11. A method of personalizing the display of changes to a common list of documents maintained in an external service, comprising the steps of:

designating a resource set of pages for the external service to track, the external service retrieving various versions of those documents at selected intervals from an external repository and storing the versions which contain changes, multiple users having access to the external service and the external repository to view documents stored therein, storing information concerning the version of the document that the user views; and generating a list of modified documents and using the stored information to personalize the list, the list thus displaying modification data for the documents which the user has viewed based on the information.

12. The method according to claim 11, wherein the information is stored when the user views a document through the external service or the external repository.

13. The method according to claim 11, wherein the selected interval at which the external service retrieves documents is set based on the likelihood that the document will change and the relative importance of changes to the document.

14. The method according to claim 11, wherein the list is sorted based on the user's selected preference.

15. The method according to claim 11, further comprising the set of modifying the resource set, so that the modified set of resources is utilized to generate the list of modified documents for the user modifying that resource set without affecting the lists generated for other users of the system.

16. The method according to claim 15, wherein the step of modifying the resource set includes adding at least one resource to the set.

17. The method according to claim 16, wherein adding to the resource sets includes forming a union of one or more designated resource sets.

18. The method according to claim 17, further comprising the step of modifying the union set by adding or deleting at least one resource from the union set, so that by the modified union set is utilized to generate the list of modified documents for the user modifying that union set without affecting the lists generated for other users of the system.

19. The method according to claim 15, wherein the step of modifying the resource set includes deleting at least one resource from the set.

20. A method of determining and displaying personalized changes to documents retrieved from an external repository, comprising the steps of:

storing various versions of a document in a second repository to which several users have access, storing information regarding each user's access to the second repository, including the document version viewed by the user, determining whether a page has changed since the user last viewed the page based on the stored information.

21. The method according to claim 20, wherein the stored information includes identifying data and state data on which document version a user last viewed.

22. The method according to claim 21, wherein the identifying data corresponds to a set of state data to provide the information needed to personalize the determination of whether a page has changed since the user last viewed the page.

23. The method according to claim 20, wherein the identifying data is stored in the user's computer and the state data is stored in the second repository.

24. The method according to claim 20, wherein the identifying data is stored by the user and transmitted to the external repository on request.

25. The method according to claim 24, wherein the identifying information is stored as a cookie file.

26. The method according to claim 20, wherein the user is notified by electronic mail when a document that the user has viewed is determined by the external service to have changed.

* * * * *